United States Patent [19]

Albrecht et al.

[11] Patent Number: 5,750,634
[45] Date of Patent: May 12, 1998

[54] WATER-SOLUBLE POLYCONDENSATION PRODUCTS BASED ON AMINO-S-TRIAZINES AND THE USE THEREOF

[75] Inventors: Gerhard Albrecht, Trostberg; Josef Weichmann, Pleiskirchen; Ludwig Eibl, Truchtlaching; Christian Huber, Garching; Alfred Kern, Kirchweidach, all of Germany

[73] Assignee: SKW Trostberg Aktiengesellschaft, Trostberg, Germany

[21] Appl. No.: 617,108

[22] Filed: Mar. 18, 1996

[30] Foreign Application Priority Data

Mar. 17, 1995 [DE] Germany .............. 195 09 759.9

[51] Int. Cl.$^6$ .................................................. G08G 12/30
[52] U.S. Cl. .................. 528/254; 528/258; 528/265; 524/593; 524/597
[58] Field of Search ..................... 528/254, 258, 528/265; 524/593, 597

[56] References Cited

U.S. PATENT DOCUMENTS 4,501,839  2/1985  Bürge et al. .................. 524/247
5,071,945  12/1991  Weichmann et al. ............ 528/254

FOREIGN PATENT DOCUMENTS 0206723  12/1986  European Pat. Off. .

OTHER PUBLICATIONS

Chemical Abstracts, vol. 95, 1981, p. 282, Abstract No. 95:11611n.

*Primary Examiner*—Duc Truong
*Attorney, Agent, or Firm*—Felfe & Lynch

[57] ABSTRACT

Disclosed is a soluble polycondensation product based on amino-s-triazines with at least two amino groups and formaehyde, a process for making the product and the use thereof as an additive for an aqueous binding agent suspension.

26 Claims, No Drawings

WATER-SOLUBLE POLYCONDENSATION PRODUCTS BASED ON AMINO-S-TRIAZINES AND THE USE THEREOF

BACKGROUND OF THE INVENTION

The present invention is concerned with water-soluble polycondensation products based on amino-s-triazines with at least two amino groups and formaldehyde, as well as the use thereof as additives for aqueous binding agent suspensions.

In concrete construction, as well as in the fields of building protection and building renewal, the processing of hydraulic binding agents, for example Portland cement, blast furnace slag cement, trass and fly ash cement, as well as anhydrite and gypsum and the like, in highly concentrated aqueous suspensions with inorganic components, such as sand, gravel, crushed rock and stone dust, plays an important part.

From DE-PS 16 71 017, it is known to produce cement-containing building material mixtures with the addition of water-soluble sulphonic acid group-containing melamine-formaldehyde polycondensation products in order to increase their working properties, especially their flowability, in the case of a given water/cement ratio or to improve the mechanical properties of the hardened constructional material by reducing the amount of water added. Additives based on naphthalenesulphonic acid-formaldehyde polycondensation products are described, for example in EP-A-0 214 412.

A general disadvantage of these additives, referred to as superplasticizers or water-reducing agents, is the decrease of the flowability of correspondingly produced building material mixtures in a relatively short space of time. The need for processing agents for building materials which, in the case of maintenance of the positive properties of conventional flow agents, such as high early strength and small air introduction, can solve the problem of the short maintenance of the flowability, is, consequently, great.

Therefore, it is an object of the present invention provide new additives for aqueous binding agent suspensions which do not display the above-mentioned disadvantages of the prior art but rather can maintain the flowability of the correspondingly produced building material mixtures over a practically sufficiently long period of time without retarding the setting and hardening process and, due to the low degree of air introduction, do not cause any disadvantages in the case of the mechanical properties of the hardened building material.

THE INVENTION

According to the present invention, the above-stated object is achieved by water-soluble polycondensation products based on amino-s-triazines with at least two amino groups, formaldehyde and sulphite in the mol ratio of 1:0.5 to 5.0:0.1 to 1.5 which is produced by condensing in aqueous solution at a pH value of 9.0 to 12.0 and at a temperature of 40° to 90° C. until the sulphite is no longer detectable and, towards the end of the adding pre-condensation, per mol of amino-s-triazine used, 0.01 to 1.0 mol of a polyoxyalkylene derivative of the general formula:

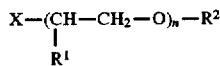
(I)

wherein X is $-NH_2$, $-NH-CO-NH_2$, $-O-CO-NH_2$ or $-O-CO-NH-R^3-NH-CO-Z$, $R^1$ is a hydrogen atom or an aliphatic hydrocarbon radical with up to 4 carbon atoms, $R^2$ is a hydrogen atom or an aliphatic hydrocarbon radical with up to 20 carbon atoms, a cycloaliphatic radical with 5 to 8 carbon atoms or an optionally substituted aromatic hydrocarbon radical with 6 to 10 carbon atoms or

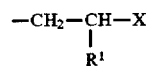

wherein $R^3$ is an aliphatic hydrocarbon radical with 2 to 18 carbon atoms, a cycloaliphatic hydrocarbon radical with 4 to 15 carbon atoms, an aromatic hydrocarbon radical with 6 to 15 carbon atoms or an araliphatic hydrocarbon radical with 8 to 15 carbon atoms, Z is $-NH_2$, $-NH-CO-NH_2$ and n is a number from 1 to 100 and/or a$_2$) an aldehyde-acid derivative of the general formula:

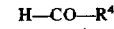
(II)

wherein $R^4$ is COOH or a phenyl radical with —COOH, —SO$_3$H or —PO$_3$H$_2$ or the mono- or divalent salts thereof is first allowed to react with the amino-s-triazine in an amount of 0.01 to 1.5 mol per mol of amino-s-triazine at a pH value of 4.5 to 6.5 and at a temperature of 20° to 90° C. and subsequently with formaldehyde in an amount of 0.5 to 5.0 mol per mol of amino-s-triazine, optionally with the addition of sulphite and/or a polyoxyalkylene derivative at a pH value of 9.0 to 12.0 and at a temperature of 40° to 90° and b) subsequent to step a$_1$) or a$_2$), further condensation is carried out at a pH value of 3.0 to 7.0 and at a temperature of 40° to 90° C. until the viscosity of the solution at 20° C. and a solids content of 20% by weight has a value of 2 to 10 cSt.

Surprisingly, it has been shown that the polycondensation product according to the present invention possesses a dispersing action which is at least just as good as the sulphonated melamine-formaldehyde resins according to the prior art, whereby the flowability of constructional mixture appropriately produced with the help of the polycondensation products according to the present invention can be maintained for a comparatively long period of time. Furthermore, in spite of the delayed stiffening of the building material mixture, no negative effects are observed in the setting and hardening process and no losses in the case of the mechanical properties of the hydrated constructional body caused by incorporated macro air pores.

A further subject of the present invention is a process for the production of the polycondensation products according to the present invention. This production process is carried out in two condensation steps a) and b). The first condensation step a), namely the pre-condensation, can hereby take place in two different ways.

According to a first alternative embodiment (condensation step a1), amino-s-triazine, formaldehyde and sulphite are condensed in a mol ratio of 1:0.5 to 5.0:0.1 to 1.5 in aqueous solution at a pH value of 9.0 to 12.0 at a temperature of 40° to 90° C. until the sulphite is no longer detectable. Melamine is preferably used as amino-s-triazine with at least two NH$_2$ groups. The use of monosubstituted amino-s-triazines, such as benzo- or acetoguanamine, is also possible. In general, within the scope of the present invention, up to 50 mol % of the amino-s-triazine can be replaced by other aminoplast formers, in which, for example, urea, thiourea, dicyandismide or guanidine (salts) can be used.

As aldehyde, formaldehyde is preferably used in the form of a 30% or even higher percentage aqueous formalin solution or also as paraformaldehyde.

For the modification of the polycondensation products according to the present invention into water-soluble or water-compatible form, use is made of conventional sulphite derivatives, for example alkali metal and alkaline earth metal sulphites, as well as the hydrogen and pyrosulphites thereof.

For this embodiment of the present invention, it is important that, towards the end of the precondensation $a_1$), per mol of amino-s-triazine used, there is added 0.01 to 1.0 mol and especially 0.05 to 0.5 mol of a polyoxyalkylene derivative of the general formula:

wherein X is —$NH_2$, —NH—CO—$NH_2$, —O—CO—$NH_2$ or —O—CO—NH—$R^3$—NH—CO—Z, $R^1$ is a hydrogen atom or an aliphatic hydrocarbon radical with up to 4 carbon atoms, $R^2$ is a hydrogen atom, an aliphatic hydrocarbon radical with up to 20 carbon atoms, a cycloaliphatic radical with 5 to 8 carbon atoms or an optionally substituted aromatic hydrocarbon radical with 6 to 10 carbon atoms, as well as

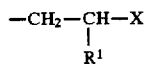

$R^3$ is an aliphatic hydrocarbon radical with 2 to 18 carbon atoms, a cycloaliphatic hydrocarbon radical with 4 to 15 carbon atoms, an aromatic hydrocarbon radical with 6 to 15 carbon atoms or an araliphatic hydrocarbon radical with 8 to 15 carbon atoms. Z is —$NH_2$ or —NH—CO—$NH_2$ and n is 1 to 100.

As mono- or difunctional polyoxvalkylene glycol-amines (X=—$NH_2$) ureides (X=—NH—CO—$NH_2$) or carbamates (X=—O—CO—$NH_2$), there are preferably used the corresponding ethylene- or propylene oxide compounds. The aliphatic hydrocarbon radicals $R^1$ and $R^2$ can hereby be straight-chained or branched or also unsaturated. As aromatic hydrocarbon radicals,there are hereby preferably used phenyl or naphthyl radicals. In the case of $R^2$ being phenyl, the phenyl radical can also contain substituents, in which case $C_1$-$C_{20}$-alkyl radicals, as well as hydroxyl or sulphonic acid groups, are preferred.

In the case of polyoxyalkylene derivatives in which X is —O—CO—NH—$R^3$—NH—CO—Z, $R^3$ is an aliphatic hydrocarbon radical with 2 to 18 and preferably 6 to 10 carbon atoms, a cycloaliphatic hydrocarbon radical with 4 to 15 and preferably 5 to 10 carbon atoms, an aromatic hydrocarbon radical with 6 to 15 and preferably 6 to 13 carbon atoms or an araliphatic hydrocarbon radical with 8 to 15 and preferably 8 to 13 carbon atoms and Z is —$NH_2$ or —NH—CO—$NH_2$. The production of the corresponding derivatives takes place by a two-step reaction of a bifunctional isocyanate component $R^3(NCO)_2$ in a first reaction step with an equivalent of polyalkyleneglycol to give an NCO-terminated polyurethane prepolymer and subsequent reaction with ammonia or urea to give the corresponding urea or biuret derivative.

As isocyanate components $R^3(NCO)_2$, there are preferably used the technically easily obtainable aromatic diisocyanates, for example 2,4- or 2,6-toluenediisocyanate (TDI), as well as any desired mixtures of these isomers, 1,5-naphthalene diisocyanate (NDI), aliphatic diisocyanates, for example 1,6-diisocyanatohexane (HDI), cycloaliphatic diisocyanates, for example 2,4- and 4,4-diisocyanatodicyclohexylmethane (Desmodur W) and 3-(isocyanatomethyl)-3,5,5-trimethylcyclohexylisocyanate (IPDI), as well as araliphatic diisocyanates, for example 1,3-bis-(1-isocyanato-1-methylethyl)-benzene (TMXDI).

According to a preferred embodiment, the mol ratio of amino-s-triazine to formaldehyde in reaction step $a_1$) is adjusted to 1:1.5 to 3.5 and the mol ratio of amino-s-triazine to polyoxyalkylene derivative so that the sum of sulphite and polyoxyalkylene derivative amounts to 0.5 to 1.5 mol per mol of amino-s-triazine.

According to a second alternative embodiment, the precondensation according to reaction step $a_2$) takes place in such a way that an aldehyde acid derivative of the general formula:

in which $R^4$ is —COOH or a phenyl radical with —COOH, —$SO_3H$ or —$PO_3H_2$ or mono- or divalent salts thereof, is first reacted with the amino-s-triazine in an amount of 0.01 to 1.5 mol and preferably of 0.05 to 1.0 mol per mol of amino-s-triazine at a pH value of 4.5 to 6.5 and a temperature of 20° to 90° C. and subsequently with formaldehyde in an amount of 0.5 to 5.0 mol and preferably of 1.5 to 3.5 mol per mol of amino-s-triazine with the addition of sulphite and possibly of a polyoxyalkylene derivative at a pH value of 9.0 to 12.0 and a temperature of 40° to 90° C.

Preferred aldehyde acid derivatives include aldehyde carboxylic, sulphonic and phosphonic acids and especially glyoxylic acid, benzaldehyde carboxylic acid, benzaldehyde sulphonic acid and benzaldehyde disulphonic acid. As mono- or divalent salts of these aldehyde acid derivatives, there are preferably used the alkali metal salts, for example sodium or potassium salts, alkaline earth metal salts, for example calcium salts, as well as ammonium salts or salts of organic amines.

The adjustment of the pH value in reaction steps $a_1$) and $a_2$) can take place with the usual alkaline-reacting compounds or salts, especially hydroxides. For reasons of cost, aqueous sodium hydroxide solution is preferably used for the alkaline pH value adjustment.

If, according to reaction step $a_2$), a polyoxyalkylene derivative is also added, then the sum of aldehyde acid derivative, sulphite and polyoxyalkylene derivative should preferably amount to 0.5 to 15 mol per mol of amino-s-triazine. The condensation reaction is carried out in aqueous solution, the total concentration of the reaction mixture preferably being so adjusted that the final condensation product is obtained with a solids content of 20 to 50% by weight.

Subsequent to reaction step $a_1$) or $a_2$), the precondensate is then further condensed at a pH value of 3.0 to 7.0 and at a temperature of 40° to 90° C. until the viscosity of the solution at 20° C. and at a solids content of 20% by weight has a value of 2 to 10 cSt. The acidic pH value in the second reaction step b), which is preferably 4.5 to 6.0, is adjusted with the usual acids or acid-reacting compounds or salts, inorganic mineral acids and especially sulphuric acid thereby being preferred for reasons of cost. Also preferred are those acids which also contain additional sulphonic acid groups and these sulphonic acid groups can be introduced into the condensation product, for example sulphanilic acid and/or amidosulphonic acid, namely, especially in an amount of up to 0.7 mol per mol of amino-s-triazine.

The condensation reaction, which is preferably carried out at a temperature of 50° to 70° C., is ended when the viscosity of the aqueous solution at 20° C. and a solids content of 20% by weight has a value of 2 to 10 cSt. The condensation reaction is subsequently discontinued by the addition of a basic compound and adjustment of a basic pH value.

If the polycondensation products according to the present invention still have a relatively high content of free formaldehyde, in the scope of the present invention it is also possible to reduce this free formaldehyde content by a subsequent alkaline treatment at an elevated temperature, for example according to EP-PS 0 336 165. If necessary or desired, the polycondensation products can be converted into solid form by distillative separating off of the water, by precipitation with an appropriate solvent or by spray drying.

The polycondensation products according to the present invention are especially suitable as additives for aqueous suspensions based on inorganic-binding agents, especially cement, lime, gypsum, whereby they are used in an amount of 0.01 to 10% by weight and preferably of 0.1 to 5% by weight, referred to the weight of the inorganic binding agent. In comparison with water-soluble aminoplast condensation products according to the prior art, the polycondensation products according to the present invention impart a substantially longer workability to the correspondingly produced building material mixtures without thereby losing the positivetechnical properties of use, such as high early strength, insensitivity with regard to overdosings and low introduction of air.

The following Examples are given for the purpose of illustrating the present invention.

EXAMPLE 1

In a 1 liter reaction vessel equipped with a thermometer, a stirrer, a reflux condenser, a pH measurement device and a dropping funnel there are placed 350 g (3.50 mol) formalin (30% aqueous solution) and 290 g water. A pH value of 8.5 is adjusted with a few drops of 20% aqueous sodium hydroxide solution. While stirring, 126 g (1.00 mol) melamine are thereafter introduced into the reaction solution. Subsequently, 90.5 g (0.475 mol) sodium disulphite, as well as 12.5 g 20% aqueous sodium hydroxide solution, are added thereto in order to adjust a pH value of 10.5. The internal temperature of the reactor, which has already increased to 58° C., is further increased by heating to 70° C. and the reaction mixture is stirred at this temperature for 100 minutes. Thereafter, over a period of time of 30 minutes, 100 g (0.20 mol) methyl polyethylene glycolamine (average molecular weight 500) in 125 g of water are added thereto and the mixture obtained is stirred for 30 minutes at 70° C. and a pH value of 11.03.

With the maintenance of the inner temperature of the reactor of 70° C. 67 g of 20% aqueous sulphuric acid are added thereto and condensed at a pH value of 5.10 up to an end viscosity of 9 cSt (according to Ubbelohde at 70° C.), which corresponds to a viscosity of 6.03 cSt at 20° C., measured on a 20% by eight solution.

Subsequently, by the addition of 15.3 g of aqueous 50% sodium hydroxide solution with stirring, a pH value of 10.03 is adjusted and the reaction mixture is cooled to 25° C.

The clear aqueous solution obtained of the modified melemine-formaldehyde polycondensate has a solids content of 34.1% by weight.

EXAMPLE 2

A melamine-formaldehyde-sulphite precondensate produced analogously to Example 1 at 70° C. from 333 g (3.33 mol) formalin (30%), 126 g (1.00 mol) melamine, 100 g (0.53 mol) sodium disulphite and 12.5 g 2% aqueous sodium hydroxide solution in 290 g water is, after sulphite is no longer detectable, mixed with 50 g (0.10 mol) methylpolyethylene glycolamine (average molecular weight 500) in 75 g of water, the pH value thereby increasing from 11.13 to 11.23.

Immediately thereafter, 96 g of 10% aqueous sulphuric acid are added thereto, a pH value of 5.33 thereby being adjusted. At an internal temperature of the reactor of 70° C., condensation is continued to an end viscosity of 4.5 cSt according to Ubbelohde (3.96 cSt at 20° C., 20% by weight solution).

By means of the addition of 24 g of 20% aqueous sodium hydroxide solution, the water-clear solution is adjusted to a pH value of 10.15 and cooled. The aqueous polycondensate solution has a solids content of 32.1% by weight.

EXAMPLE 3

The procedure is carried out as described in Example 2 but with the following amounts of chemicals:
350 g (3.50 mol formalin (30%)
126 g (1.00 mol) melamine
86 g (0.45 mol) sodium disulphite
20 g aqueous sodium hydroxide solution (20%)
180 g water
80 g sulphuric acid (20%)
150 g (0.30 mol) methylpolyethyleneglycolamine (average molecular weight 500) in 225 g water.

The condensation is carried out at a pH value of 5.23 and, after reaching an Ubbelohde end viscosity of 13 cSt at 70° C., ended by the addition of 18 g of 50% aqueous sodium hydroxide solution. The viscosity of a 20% by weight solution is 6.47 cSt at 20° C.

The water-clear solution has a solids content of 36.9% by weight at a pH value of 10.54 at 25° C.

EXAMPLE 4

The reaction described in Example 2 is repeated with the following amounts of chemicals:
350 g (3.50 mol) formalin (30%)
126 g (1.00 mol) melamine
52 g (0.27 mol) sodium disulphite
37 g aqueous sodium hydroxide solution (50%)
260 g water
50 g (0.10 mol) methylpolyethylene glycolamine (average molecular weight 500) in 75 g water.

In contradistinction to the process described in Examples 1 to 3, the precondensate formation and the polycondensation takes place at a reaction temperature of 50° C., the pH value in step b) being adjusted with 96 g sulphanilic acid. It is condensed to a viscosity of 4.60 cSt (20% by weight solution, 20° C.) and, after breaking off of the condensation (addition of 28.9 g of 50% aqueous sodium hydroxide solution), there remains a clear, black-coloured solution with a solids content of 37.1% by weights.

EXAMPLE 5

In the reaction vessel described in Example 1 are placed 30 g (0.20 mol) of 50% aqueous glyoxylic acid and 300 g water. While stirring, a pH value of 4.30 is adjusted with 16 g of 50% aqueous sodium hydroxide solution and 126 g (1.00 mol) of melamine added thereto. The reaction mixture is heated to 50° C. and stirred at this temperature for 1 hour, the pH value thereby increasing to 5.78.

Subsequently 300 g (3.00 mol) formalin (30% aqueous solution) as well as 52 g (0.27 mol) sodium disulphite and 41.3 g sodium hydroxide (50% aqueous solution) are added thereto and stirred for 50 minutes at 50° C. (sulphomethylation).

As soon as sulphite is no longer detectable, the reaction mixture is adjusted to a pH value of 5.50 by the addition of 96 g sulphanilic acid and condensed to an end viscosity of 30.0 cSt corresponding to 5.08 cSt at 20° C. (20% by weight solution). The dark coloured reaction solution is rendered alkaline with 11.5 g sodium hydroxide (50%). It has a solids content of 37.7% by weight.

EXAMPLE 6

Example 5 is repeated but, instead of the glyoxylic acid there used, there are used 65.2 g (0.20 mol) 2-benzaldehyde-sulphonic acid.

Furthermore, the amounts of the other components used are changed as follows:
330 g (3.30 mol) formalin (30%)
350 g water
126 g (1.00 mol) melamine
37 g sodium hydroxide (50%)
48 g (0.25 mol) sodium disulphite.

The adjustment of the condensation pH value takes place with sulphanilic acid. The condensation is broken off at a viscosity of 25.0 cSt (70° C.), corresponding to 5.18 cSt at 20° C. (20% by weight solution), by the addition of 28.6 g sodium hydroxide (50%). A clear solution is obtained which contains 37.3% by weight of solids.

EXAMPLE 7

The reaction takes place analogously to the process described in Example 6 but with 32.6 g (0.10 mol) 2-benzaldehyde-sulphonic acid. The end product has a viscosity of 25 cSt (50° C.) or of 4.78 cSt (20° C., 20% by weight solution) and a solids content of 36.4% by weight.

EXAMPLE 8

According to the procedure described in Example 5, there is first produced a precondensate of melamine and 2-formylbenzoic acid which is sulphomethylolated under alkaline conditions at pH 11.53 in the manner described in Example 5. The polycondensation takes place at pH 5.30 up to an Ubbelohde end viscosity of 25.0 cSt measured at 50° C., corresponding to 4.82 cSt at 20° C. (20% by weight solution). The aqueous polycondensate solution obtained has, after neutralisation with sodium hydroxide (50%), a pH value of 10.60 and a solids content of 36.9% by weight.

EXAMPLE 9

Example 5 is repeated but with 220 g (2.20 mol) formalin (30%). The end product has a viscosity of 2.97 cSt (20° C., 20% by weight solution) and a solids content of 38.4% by weight and contains 0.1% by weight of free formaldehyde.

EXAMPLE 10

In the apparatus described in Example 1 are placed 330 g (3.30 mol) formalin (30% aqueous solution) and 270 g of water. A pH value of 8.5 is adjusted with 20% aqueous sodium hydroxide solution and subsequently there are successively added thereto 100.8 g (0.80 mol) melamine, 12.0 g (0.20 mol) urea, 72.2 g (0.38 mol) sodium disulphite, as well as 12 g of 20% aqueous sodium hydroxide solution, with stirring. The temperature is increased to 70° C. and the reaction mixture is stirred at this temperature for 70 minutes. Subsequently, 75 g (0.15 mol) methylpolyethyleneglycolamine (average molecular weight 500) in 90 g of water are added thereto and the mixture obtained is stirred for 45 minutes at 70° C.

Thereafter, by means of the addition of 20% sulphuric acid, a pH value of 5.15 is adjusted and condensed to an end viscosity of 8 cSt (70° C., Ubbelohde). By means of the addition of 50% aqueous sodium hydroxide solution, a pH value of 10.40 is adjusted and the reaction mixture is cooled. The clear aqueous solution of the end product contains 35% by weight of solids (viscosity of the 20% by weight solution: 5.29 cSt at 20° C.).

EXAMPLE 11

Example 1 is repeated but 161.5 g (0.10 mol) of an equimolar reaction product of ammonia, 2,4-toluenediisocyanate and methylpolyethylene glycol (average molecular weight 500) are used instead of the there-used methylpolyethylene-glycolamine (average molecular weight 500). It is condensed to an end viscosity of 8.4 cSt (70° C., Ubbelohde) and a product is obtained with a solids content of 37.3% by weight, a 20% by weight solution of which has a viscosity of 5.16 cSt at 20° C.

Comparison 1

Commercially-available sulphonated melamine-formaldehyde polycondensation product in the form of the sodium salt (Melment L10).

Comparison 2

Commercially-available sulphonated naphthalene-formaldehyde polycondensation product in the form of the sodium salt (LOMAR D).

The aqueous polycondensation solutions obtained were subjected to a comparative test as additives for cement-containing solid material suspensions in order to demonstrate their increased and longer-lasting effectiveness in comparison with conventional superplasticizers.

Application Example 1

900 g of Portland cement PZ 35 Kiefersfelden are stirred in a mixer in standardised manner with 1350 g standard sand (coarse material:fine material=2:1) and 405 g of water (water/cement ratio=0.45) which contains the polycondensation products according to the present invention in dissolved form.

Referred to the solids material of the aqeous condensate solutions, there is carried out a uniform dosing of 0.50% by weight, referred to the cement.

Immediately after the production of the cement mortar, there is determined the flow, as well as the time-dependant change over a period of time of 60 minutes. For this purpose, there is used a stainless steel flow trough of 80 cm length with a filling funnel (1000 ml filling amount). The dispersing action of a superplasticizer is the better, the greater is the path which a constant amount of fresh mortar has passed in the flow trough with a period of time of 120 seconds. The results of this comparative testing are summarised in the following Table 1.

TABLE 1

Flow behaviour of mortar mixtures with products according to the invention and with comparative products

| additive | solids % by wt. | Flow in mm immediately | after 30 min. | after 60 min. |
|---|---|---|---|---|
| Example 1 | 34.1 | 480 | 490 | 460 |
| Example 2 | 32.1 | 590 | 570 | 510 |
| Example 3 | 36.9 | 400 | 410 | 390 |
| Example 4 | 37.1 | 610 | 690 | 620 |
| Example 5 | 37.7 | 670 | 640 | 570 |
| Example 6 | 37.3 | 620 | 520 | 480 |
| Example 7 | 36.4 | 620 | 570 | 490 |
| Example 8 | 36.9 | 620 | 570 | 520 |
| Example 9 | 38.4 | 610 | 600 | 500 |
| Example 10 | 35.0 | 470 | 480 | 470 |
| Example 11 | 38.2 | 430 | 440 | 440 |
| Comp. 1 | 40.5 | 340 | 220 | 190 |
| Comp. 2 | 37.0 | 470 | 430 | 310 | water-cement ratio: 0.45
dosaging: 0.50% by wt. referred to PZ 35 Kiefersfelden

In order to demonstrate the setting and air entraining properties of the products according to the present invention, comparative tests were carried out in concrete mixtures.

Application Example 2

In a standardised manner, in a forced circulation mixer of 5.3 kg of Portland cement (PZ 35 Kiefersfelden) are mixed with 33.0 kg of aggregates (grading curve 0–32 mm) and 2.65 kg of water (less the water from the additives). The aqueous solutions of the products according to the present invention and of the comparison products are added thereto and 10 minutes after the addition of the superplasticizers there is carried out the determination of the flow table spreads according to German Industrial Standard DIN 1048 (double determination).

Subsequent to the measurement of the flow table spreads, test bodies are produced with 15×15×15 cm edge length and the compressive strength determined after 24 hours, as well as the proportion of air pores. The results obtained are summarised in the following Table 2.

TABLE 2

Cement testing according to DIN 1048

| additive | dosage % solids ref. to Portland cement | flow table spread in [mm] | bulk density [kg/m³] | air content [vol. %] | 1-day compressive strength [N/mm²] |
|---|---|---|---|---|---|
| Example 1 | 0.48 | 575 | 2.49 | 2.5 | 13.9 |
| Example 2 | 0.43 | 550 | 2.50 | 2.1 | 14.5 |
| Example 3 | 0.48 | 540 | 2.48 | 3.4 | 13.4 |
| Example 4 | 0.43 | 575 | 2.51 | 1.1 | 14.0 |
| Example 5 | 0.41 | 585 | 2.51 | 1.4 | 12.9 |
| Example 6 | 0.43 | 580 | 2.50 | 2.0 | 12.3 |
| Example 7 | 0.43 | 575 | 2.50 | 2.2 | 13.3 |
| Example 8 | 0.43 | 570 | 2.49 | 2.9 | 13.9 |
| Example 9 | 0.40 | 575 | 2.51 | 0.9 | 12.7 |
| Example 10 | 0.47 | 545 | 2.50 | 1.9 | 14.5 |
| Example 11 | 0.47 | 560 | 2.48 | 3.0 | 12.9 |
| Comp. 1 | 0.47 | 545 | 2.50 | 1.9 | 14.5 |
| Comp. 2 | 0.45 | 555 | 2.47 | 3.8 | 12.0 |

It will be understood that the specification and examples are illustrative but not limitative of the present invention and that other embodiments within the spirit and scope of the inventions will suggest themselves to those skilled in the art.

We claim:

1. A water-soluble condensation product comprising: amino-s-triazine, formaldehyde and sulphite in a mole ratio of 1:0.5 to 5.0:0.1 to 1.5, containing per mole of amino-s-triazine, a least one organic component selected from the group consisting of a) 0.01 to 1.0 mole of a polyoxyalkylene derivative of the formula:

$$X-(CH-CH_2-O)_n-R^2 \quad (I)$$
$$\quad\;\; | $$
$$\quad\;\; R^1$$

wherein

X is $-NH_2$, $-NH-CO-NH_2$ or $-O-CO-NH-R^3-NH-CO-Z$;

$R^1$ is a hydrogen atom or an aliphatic hydrocarbon radical with up to 4 carbon atoms;

$R^2$ is a hydrogen atom, an aliphatic hydrocarbon radical with up to 20 carbon atoms, a cycloaliphatic radical with 5 to 8 carbon atoms, an optionally substituted aromatic hydrocarbon radical with 6 to 10 carbon atoms, or $$-CH_2-CH-X$$
$$\quad\;\; |$$
$$\quad\;\; R^1 \quad ;$$

$R^3$ is an aliphatic hydrocarbon radical with 2 to 18 carbon atoms, a cycloaliphatic hydrocarbon radical with 4 to 15 carbon atoms, an aromatic hydrocarbon radical with 6 to 15 carbon atoms or an araliphatic hydrocarbon radical with 8 to 15 carbon atoms;

Z is $-NH_2$, $-NH-CO-NH_2$; and n is a number from 1 to 100; and b) 0.01 to 1.5 mole of an aldehyde acid derivative of the formula:

$$-H-CO-R^4 \quad (II)$$

wherein $R^4$ is COOH or a phenyl radical with $-COOH$, $-SO_3H$ or $-PO_3H_2$ or the mono- or divalent salts thereof condensed in;

wherein an aqueous solution having a solids content of 20% by weight of the condensation product has a viscosity of 2 to 10 cSt at 20° C.

2. The condensation product of claim 1, containing a compound of general formula (I)

wherein

X is $-NH_2$ or $-O-CO-NH-R^3-NH-CO-Z$, $R^1$ a hydrogen atom or a methly radical, $R^3$ toluylene or xylylene, Z is $NH_2$, and, n is 7 to 15.

3. The condensation product of claim 2 containing as compound of general formula (II), at least one compound selected from the group consisting of glyoxylic acid, benzaldehydesulphonic acid and formylbenzoic acid.

4. The condensation product of claim 2, wherein the amino-s-triazine consists wholly or predominantly of melamine.

5. The condensation product of claim 2, wherein up to 50 mole % of the amino-s-triazine is replaced by at least one aminoplast former selected from the group consisting of urea, thiourea, dicyandiamide or guanidine (salts).

6. The condensation product of claim 2, wherein the mole ratio of amino-s-triazine to formaldehyde is 1:1.5 to 3.5.

7. The condensation product of claim 2, wherein the sum of sulphite and polyoxyalkylene derivative is 0.5 to 1.5 mole per mole of amino-s-triazine.

8. The condensation product of claim 2, wherein the sum of aldehyde acid derivative and sulphite and optionally polyoxyalkylene derivative amounts to 0.5 to 1.5 mole per mole of amino-s-triazine.

9. The condensation product of claim 2, wherein $R^2$ is a phenyl radical with at least one substituent from the group $C_1$-$C_{20}$-alkyl radicals, hydroxyl groups and sulphonic acid groups.

10. A process for the production of a water-soluble polycondensation product based on amino-s-triazine by condensation in two steps comprising at least one of steps $a_1$) and $a_2$), wherein step $a_1$) comprises condensing amino-s-triazine, formaldehyde and sulphite in a mole ratio of 1:0.5 to 5.0:0.1 to 1.5 in aqueous solution at a pH of 9.0 to 12.0 and at a temperature of 40° to 90° C. until the sulphite is no longer detectable; and adding near the end of precondensation, per mole of amino-s-triazine, 0.01 to 1.0 mole of a polyoxyalkylene derivative of the general formula:

   (I)

wherein

X is —$NH_2$, —NH—CO—$NH_2$, —O—CO—$NH_2$ or —O—CO—NH—$R^3$—NH—CO—Z;

$R^1$ is a hydrogen atom or an aliphatic hydrocarbon radical with up to 4 carbon atoms;

$R^2$ is a hydrogen atom, an aliphatic hydrocarbon radical with up to 20 carbon atoms, a cycloaliphatic radical with 5 to 8 carbon atoms, an optionally substituted aromatic hydrocarbon radical with 6 to 10 carbon atoms, or

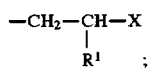

$R^3$ is an aliphatic hydrocarbon radical with 2 to 18 carbon atoms, a cycloaliphatic hydrocarbon radical with 4 to 15 carbon atoms, an aromatic hydrocarbon radical with 6 to 15 carbon atoms or an araliphatic hydrocarbon radical with 8 to 15 carbon atoms;

Z is —$NH_2$ or —NH—CO—$NH_2$; and n is a number from 1 to 100;

and wherein step $a_2$) comprises first reacting an aldehyde acid derivative of the general formula;

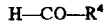

wherein $R^4$ is —COOH or a phenyl radical with —COOH, $SO_3H$ or —$PO_3H_2$ or a mono- or divalent salt thereof with the amino-s-triazine in an amount of 0.01 to 1.5 mole per mole of amino-s-triazine at a pH of 4.5 to 6.5 and at a temperature of 20° to 90° C. and subsequently with formaldehyde in an amount of 0.5 to 5.0 mole per mole of amino-s-triazine, optionally with the addition of sulphite and/or of a polyoxyalkylene derivative at a pH value of 9.0 to 12.0 and at a temperature of 40° to 90° C.; and b) subsequent to step $a_1$) or $a_2$), further condensing at a pH of 3.0 to 7.0 and at a temperature of 40° to 90° C. until the viscosity of the solution at 20° C. and a solids content of 20% by weight is from 2 to 10 cSt.

11. The process of claim 10, wherein melamine is used as amino-s-triazine.

12. The process of claim 10, wherein up to 50 mole % of the amino-s-triazine is replaced by one of more other aminoplast formers selected from the group urea, thiourea, dicyandiamide and guanidine (salts).

13. The process of claim 10, wherein the mole ratio of amino-s-triazine to formaldehyde in steps $a_1$) and $a_2$) is adjusted to 1:1.5 to 3.5.

14. The process of claim 10, wherein the mole ratio of amino-s-triazine to polyoxyalkylene derivative in step $a_1$) is so adjusted that the sum of sulphite and polyoxyalkylene derivative amounts to 0.5 to 1.5 moles per mole of amino-s-triazine.

15. The process of claim 10, wherein the mole ratio of amino-s-triazine to sulphite and polyoxyalkylene derivative in step $a_2$) is so adjusted that the sum of aldehyde acid derivative and sulphite or polyoxyalkylene derivative amounts to 0.5 to 1.5 mole per mole of amino-s-triazine.

16. The process of claim 10, wherein $R^2$ is a phenyl radical and is substituted with at least one substituent selected from the groups $C_1$-$C_{20}$-alkyl radicals, hydroxyl or sulphonic acid groups.

17. The process of claim 10, wherein the aldehyde acid derivative, is an aldehyde carboxylic or aldehyde sulphonic acid selected from the group consisting of glyoxylic acid, benzaldehyde carboxylic acid, benzaldehyde sulphonic acid and benzaldehyde disulphonic acid.

18. The process of claim 10, wherein mono- or divalent salts of the aldehyde acid derivatives are alkali metal salts, for example sodium or potassium salts, alkaline earth metal salts, for example calcium salts, as well as ammonium salts or salts of organic amines.

19. The process of claim 10, wherein the total concentration of the reaction components in the aqueous solution is so adjusted that the polycondensation product is obtained with a solids content of 20 to 50% by weight.

20. The process of claim 10, wherein the condensation in step b) is conducted at a pH value of 4.5 to 6.0.

21. The process of claim 10, wherein, for the pH value adjustment in step b), additional sulphonic acid group-introducing compounds are used in an amount of up to 0.7 mole per mole of amino-s-triazine.

22. The process of claim 21, wherein sulphanilic acid and amidosulphonic acid is used as additional sulphonic acid group-introducing compound.

23. The process of claim 10, wherein the temperature in step b) is adjusted to 50° to 70° C.

24. An additive for an aqueous suspension based on inorganic binding agents, especially cement, lime and gypsum comprising a polycondensation product of claim 1.

25. The additive of claim 24, wherein the polycondensation product is present in an amount of 0.01 to 10% by weight referred to the weight of the inorganic binding agent.

26. The additive of claim 24, wherein the polycondensation product is present in an amount of 0.1 to 5% by weight referred to the weight of the inorganic binding agent.

* * * * *

UNITED STATES PATENT AND TRADEMARK OFFICE
CERTIFICATE OF CORRECTION

PATENT NO. : 5,750,634
DATED : May 12, 1998
INVENTOR(S) : Albrecht et al.

Page 1 of 1

It is certified that error appears in the above-identified patent and that said Letters Patent is hereby corrected as shown below:

Column 1,
Line 45, before "provide" insert -- to --.

Column 3,
Line 4, change "dicyandismide" to -- dicyandiamide --.
Line 42, change "polyoxvalkylene" to -- polyoxyalkylene --.

Column 5,
Line 21, between "inorganic" and "binding" delete -- - --.
Line 66, change "melemine" to -- melamine --.

Column 7,
Line 66, between "A" and "pH" delete -- : --.

Column 12,
Line 19, after "and" insert -- /or --.
Line 50, after "and" insert -- /or --.

Signed and Sealed this

Sixth Day of August, 2002

Attest:

Attesting Officer

JAMES E. ROGAN
*Director of the United States Patent and Trademark Office*